Feb. 14, 1956     C. B. BURROUGHS     2,734,751
TOBACCO PICKER'S CART
Filed Oct. 8, 1953     2 Sheets-Sheet 1
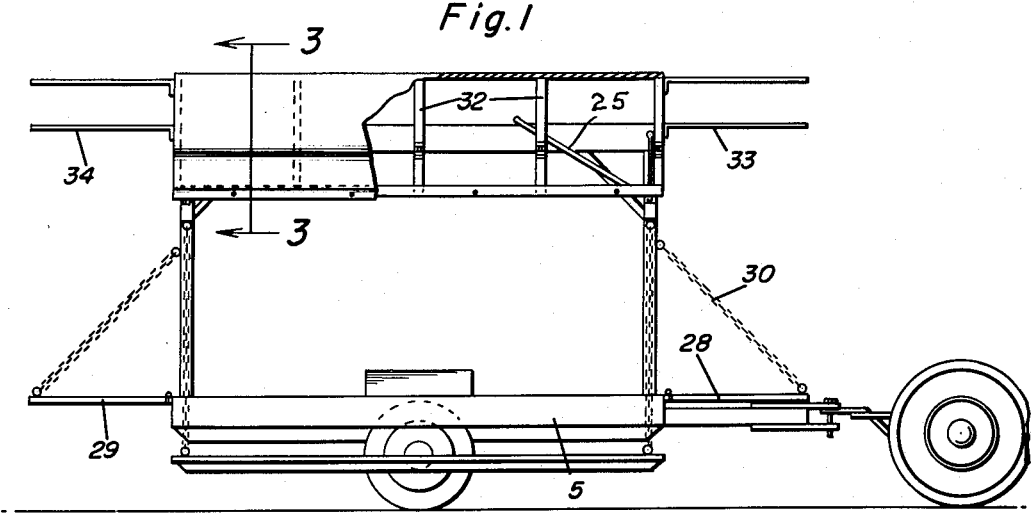
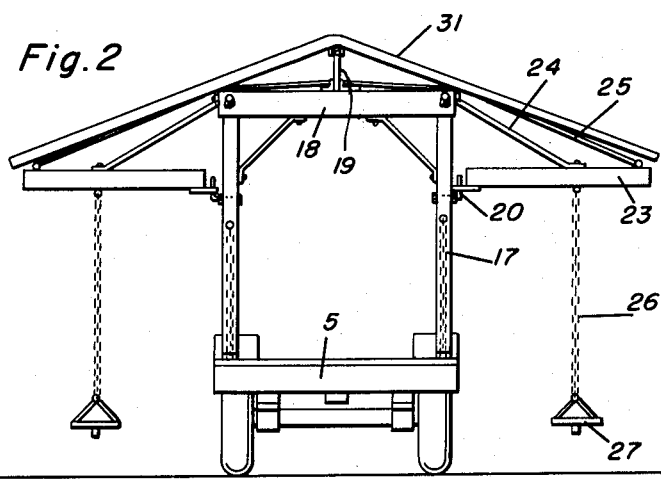
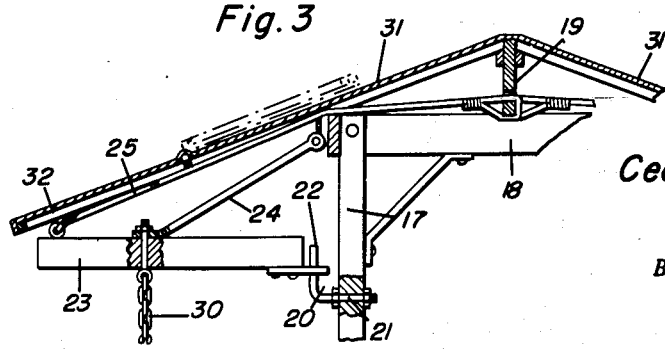
Cedric B. Burroughs
INVENTOR.
BY *Lawrence A. O'Brien*
*and Harvey B. Jacobson*
Attorneys Feb. 14, 1956 C. B. BURROUGHS 2,734,751
TOBACCO PICKER'S CART
Filed Oct. 8, 1953 2 Sheets-Sheet 2

Cedric B. Burroughs
INVENTOR.

BY
Attorneys though # United States Patent Office 2,734,751
Patented Feb. 14, 1956

2,734,751
TOBACCO PICKER'S CART
Cedric B. Burroughs, Hassell, N. C.

Application October 8, 1953, Serial No. 384,924

2 Claims. (Cl. 280—32.5)

The present invention relates to new and useful improvements in carts for use while picking and tying tobacco on drying sticks in preparation for the curing process.

An important object of the invention is to provide a cart on which the pickers as well as those who tie the tobacco on the sticks may ride to prepare the tobacco in the field ready for placing in the curing barn and thus reduce handling the loose tobacco.

Another object is to provide collapsible outriggers on the cart on which the pickers ride as well as a collapsible cover for the cart and which may be collapsed inwardly of the cart for traveling on highways.

A further object is to provide a device of this character of simple and practical construction, which is relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, in which:

Figure 1 is a side elevational view with parts broken away and shown in section;

Figure 2 is a rear elevational view;

Figure 3 is an enlarged fragmentary sectional view taken on a line 3—3 of Figure 1;

Figure 4:
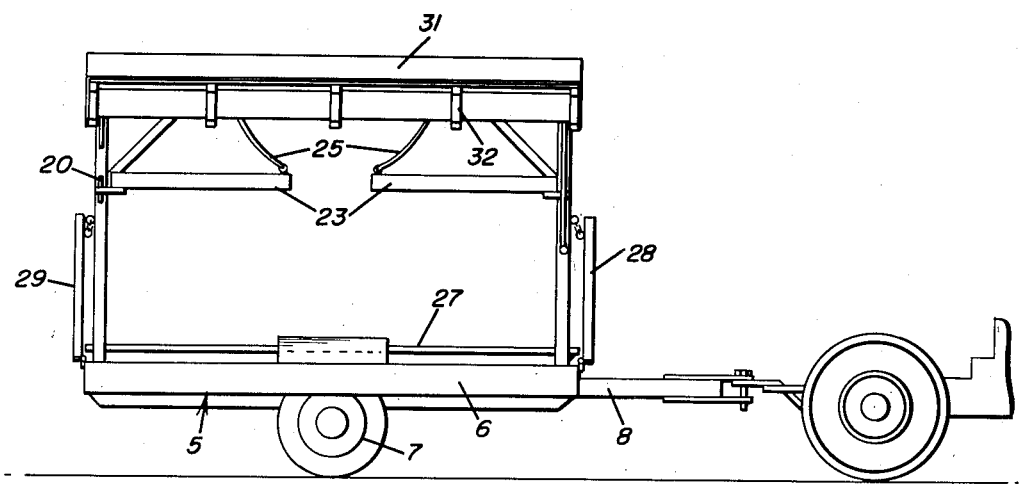
Figure 4 is a side elevational view shown in collapsed position.

Referring now to the drawings in detail, wherein for the purpose of illustration, I have disclosed a preferred embodiment of my invention, the numeral 5 designates the cart generally and which includes a platform body 6 supported on a pair of wheels and having a tongue 8 at its front end. A trailer coupling includes a lower arm 10 which is attached at its front end under a tractor or other towing vehicle 11 and extends rearwardly under the rear axle 12 and upwardly through an opening 13 in an upper arm 14 which is attached to the axle by a U-bolt 15. The rear end of arm 10 is connected to tongue 8 by a coupling pin 16.

Corner posts 17 are attached to the corners of platform body 6 to support a top frame structure 18 thereon and on top of which a central ridge beam 19 is secured.

L-shaped rods 20 have a horizontal end portion 21 secured in each corner post and an upstanding end portion 22 at the outside of the post and on which the inner ends of arms 23 are swingably supported and secured in an outwardly extended position at the adjacent side of the cart by removable braces 24 and the arms 23 are also supported by cable braces 25 which are connected to the outer ends of the arms and which extend inwardly and upwardly therefrom and are inclined toward the center of the cart and attached on top of the top frame structure 18.

Chains 26 are attached at their upper ends to the arms 23 to support benches or elongated seats 27 at the lower ends of the chains in a longitudinally extended position at each side of the cart and spaced outwardly from the latter.

Front and rear platforms 28 and 29 are hinged respectively to the front and rear ends of body 6 and are supported in a lowered horizontal position by chains 30 attached to the adjacent posts.

A canvas cover 31 is suitably secured on top of the ridge beam 19 and is supported in an outwardly sloping position at each side of the cart by foldable transversely extending ribs 32 which rest on the top frame structure 18 to support the cover in a position overlying the seats 27. Front and rear rods 33 and 34 extend respectively forwardly and rearwardly from the top frame structure to support the front and rear ends of the cover 31 over the front and rear platforms 28 and 29.

Seats (not shown) may be provided for the platform body 6.

In the operation of the device, the coupling of the cart is connected to a tractor or other vehicle for towing the cart over a field of tobacco and which has been planted to permit each seat 27 to travel between two rows of the crop. One or more pickers straddle each seat to pick and pass the picked leaves to other workers riding on the cart who then sort and tie the leaves on the usual tobacco sticks employed for hanging and curing the tobacco in a barn.

Figure 5:
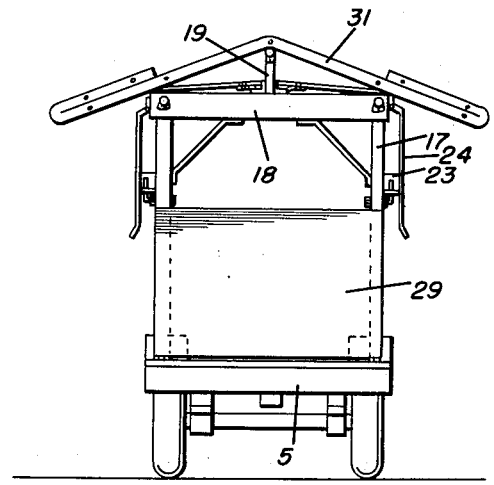
Figure 5 is a rear elevational view shown in collapsed position.
Figure 6:
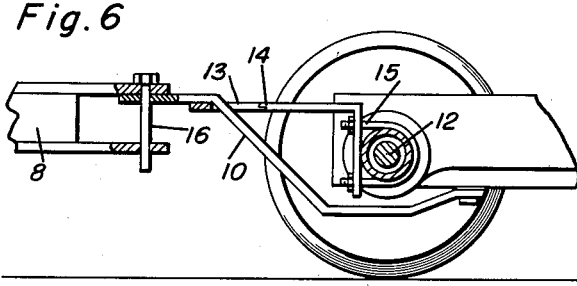
Figure 6 is an enlarged longitudinal sectional view of the trailer coupling for the cart.

When the cart is traveling on a highway, the braces 24 are detached from the arms 23 which are then swung inwardly on the supporting rods 20 and the seats 27 placed on the platform body 6. The front and rear platforms are folded upwardly and secured against the ends of the cart and the outwardly projecting side edges of the cover 31 are folded on top of the cover, as shown in Figure 5.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tobacco picker's cart comprising a wheeled platform body having draft means, corner posts at the corners of the body, a top structure supported on the corner posts, an arm swingably connected to each post for swinging inwardly and outwardly at the sides of the cart, flexible hanger type braces extending outwardly and downwardly from the top structure to the outer portion of the arms and said braces at each side of the body being also inclined in a longitudinal direction toward each other to limit outward swinging movement of the arms, seats supported in a suspended position from the front and rear arms at each side of the cart, and a roof on said top structure and projecting outwardly at the sides of the cart and having foldable outer side portions supported on said flexible braces to overlie the seats.

2. A tobacco picker's cart comprising a wheeled body having draft means, said body including a platform having posts at the corners thereof and a top structure at the upper ends of the posts, arms swingably supported on the posts for folding inwardly at the sides of the body, seats suspended from the arms for supporting the seats outwardly at the sides of the body, rigid hanger braces detachably connecting the arms to the top structure, and flexible hanger braces connecting the arms to the top structure and foldable with the arms, said top structure including a central longitudinal member and to which said flexible braces are attached to extend outwardly therefrom toward opposite sides of the top structure to mutually brace each other, and said flexible braces at each side of the body are also inclined in a longitudinal direction toward each other to limit outward swinging movement of the arms.

References Cited in the file of this patent

UNITED STATES PATENTS

| | | |
|---|---|---|
| 131,083 | Colvin | Sept. 3, 1872 |
| 223,468 | Benthall | Jan. 13, 1880 |
| 527,003 | Nicholas | Oct. 2, 1894 |
| 681,201 | Curtis | Aug. 27, 1901 |
| 730,275 | Laswell | June 9, 1903 |
| 1,431,187 | Sherwood | Oct. 10, 1922 |
| 2,378,143 | Jensen | June 12, 1945 |
| 2,453,348 | Spiegl et al. | Nov. 9, 1948 |
| 2,471,689 | Hotchkiss | May 31, 1949 |

FOREIGN PATENTS

| | | |
|---|---|---|
| 653,609 | Germany | Nov. 29, 1937 |